B. BARNES.
GEARING.
APPLICATION FILED MAY 9, 1911.

1,004,525.

Patented Sept. 26, 1911.
2 SHEETS—SHEET 1.

Witnesses:

Inventor
Benjamin Barnes

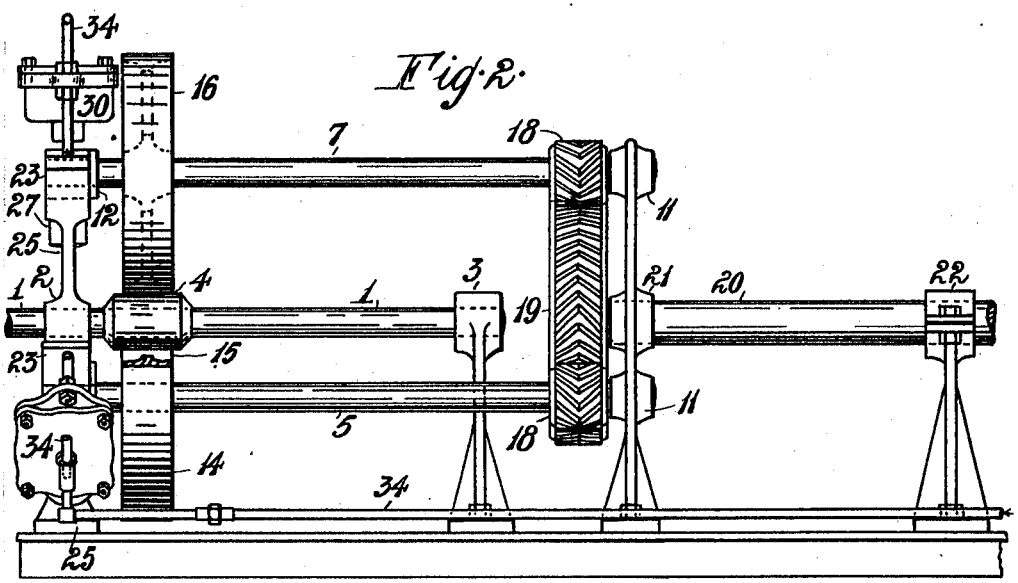

UNITED STATES PATENT OFFICE.

BENJAMIN BARNES, OF ASTON, SOUTH MELBOURNE, VICTORIA, AUSTRALIA.

GEARING.

1,004,525.

Specification of Letters Patent.  Patented Sept. 26, 1911.

Application filed May 9, 1911. Serial No. 626,078.

*To all whom it may concern:*

Be it known that I, BENJAMIN BARNES, a subject of the King of Great Britain, residing at Aston, Queens Road, South Melbourne, in the State of Victoria, Australia, have invented Improved Speed-Reducing Gearing for Marine Steam-Turbines, of which the following is a specification.

This invention has been devised in order to provide means whereby two shafts, one driving, and the other driven, may be coupled up in such a way that each may run at its proper speed with the least loss of power in the transmission, and it is intended for ships engined with steam turbines, wherein the velocities of the turbine and the propeller are incompatible.

According to this invention the turbine (driving) shaft is provided with a friction boss against which three equi-distant friction wheels of considerably larger diameter are adapted to bear. Each friction wheel is mounted in an adjustable bearing capable of being forced in the direction of the turbine shaft by means of steam pressure operating upon pistons working in short radially disposed cylinders or upon flexible diaphragms to either of which steam from the boiler is admitted for the purpose. Each friction wheel is fixed to a shaft which is adapted to drive the propeller (driven) shaft through the medium of suitable noiseless reducing gearing preferably helical gearing.

The invention is illustrated by the accompanying drawings whereof:—

Figure 1:
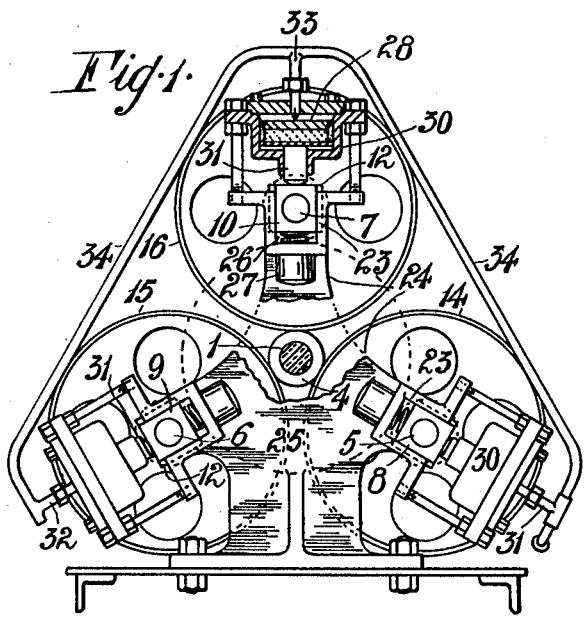
Figure 3:
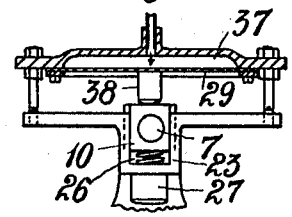
Figure 4:
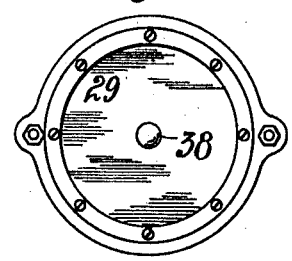

Figure 1 is an end elevation partly in section and with the central portion of the end bearing bracket broken away. Fig. 2 is a side elevation (broken). Figs. 3 and 4 are details of the diaphragm which may be employed in lieu of the piston.

Referring to these drawings, 1 designates the driving shaft of a marine steam turbine journaled in bearings 2, and 3, and provided with a friction boss 4. Around this driving shaft at equi-distance from its axis and from each other are three shafts 5, 6, and 7, journaled respectively in adjustable bearings 8, 9, and 10, at one end and at their other ends in fixed bearings 11, and upon the respective shafts are fixed the comparatively large friction wheels 14, 15, and 16, adjacent to the adjustable bearings. The shafts 5, 6, and 7, are provided with pinions 18, all gearing with a toothed wheel 19, on the propeller or driven shaft 20, which is journaled in bearings 21, and 22, and arranged in axial line with the driving shaft 1.

This reducing gearing is preferably but not necessarily of the helical type such for instance as illustrated.

The adjustable bearings 8, 9, and 10, of the driving shaft are mounted in radially disposed guideways 23, provided in similarly arranged arms 24, on the end bearing bracket 25, while the bearings are provided with guide flanges 12, engaging the sides of said arms. The bearings may be acted upon by springs 26, seated in sockets 27, formed in the arms 24, which springs will free the friction wheels 14, 15, and 16, from engagement with the central friction boss 4, when the steam pressure is cut off, as for instance in the event of its being necessary to disconnect the propeller from the driving shaft.

The bearings are adapted to be forced in the direction of the driving shaft along the guideways by means of steam pressure which operates uniformly against pistons 28, or flexible diaphragms 29, in contact with said bearings.

Fig. 1 illustrates the piston arrangement, wherein each piston is mounted in a cylinder 30, with its end or stem 31, protruding and bearing against the bearing of the shaft, while steam is delivered into the cylinders against the pistons through pipes 31, 32, and 33, connected with a supply pipe 34, leading from the boiler.

In the case of the flexible diaphragm 29, as illustrated in Figs. 3, and 4, it is preferably of thin steel and forms the bottom of the steam chamber 37, and is provided with a stem or stud 38, which bears against the bearing of the driving shaft. The steam is delivered into the chamber through a pipe, and forces the diaphragm toward the driving shaft, thus operating by means of its stem or stud 38, against the adjustable bearing.

It will be observed that on account of the pinions being geared to the toothed wheel at equal distances apart they will drive the latter without any side pressure on the central bearing, while furthermore by reason of the pistons or diaphragms being of equal area and receiving steam pressure simultaneously through a common supply pipe the equi-distant friction wheels are uniformly brought into contact with the friction boss so that the shaft receives an equilibrium of pressure. It will also be noticed that no steam is consumed by the means employed for operating the adjustable bearings as merely its pressure is utilized, and the steam does not escape.

With this gearing, power can be transmitted and the speed of a turbine shaft very considerably reduced, the reduction being determined by the ratio of gearing employed. As an extreme example, a speed of 2,000 revolutions of the turbine shaft may be reduced to 100 revolutions of the propeller shaft by making the pinions and wheel of the reducing gearing of a ratio of 4 to 1, and the boss of the turbine shaft and the friction wheels 5 to 1.

Having now fully described and ascertained my said invention and the manner in which it is to be performed, I declare that what I claim is: —

1. Improved speed reducing gearing for marine steam turbine engines, comprising a driving shaft provided with a friction boss, three comparatively large equi-distant friction wheels adapted to be brought in contact with said boss by means of steam pressure, a driven shaft, and reducing gearing for transmitting the power from said friction wheels to the driven shaft.

2. Improved speed reducing gearing for marine steam turbine engines, comprising a driving shaft provided with a friction boss, three shafts arranged at equi-distance around said driving shaft and from each other and mounted at one end in fixed bearings and at the other end in radially adjustable bearings uniformly controlled by steam pressure, a driven shaft, a toothed wheel on the driven shaft, comparatively large friction wheels on said shafts adjacent to said adjustable bearings and reducing pinions at the other ends of said shafts gearing with the toothed wheel on the driven shaft.

3. Improved speed reducing gearing for marine steam turbine engines, comprising a driving shaft provided with a friction boss, three equi-distant shafts around said driving shaft mounted at one end in fixed bearings and at the other end in radially adjustable bearings, steam pressure controlled pistons for operating said adjustable bearings, comparatively large friction wheels on said shafts adapted to be brought into contact with said boss, a driven shaft, and reducing gearing for transmitting the power from said friction wheels to the driven shaft, and arranged in axial line with the driving shaft.

4. Improved speed reducing gearing for marine steam turbine engines, comprising a driving shaft provided with a friction boss, a plurality of shafts arranged at equi-distance around said driving shaft and from each other and journaled at one end in fixed bearings and at the other end in adjustable bearings, a bracket formed with radially disposed guideways in which said bearings are mounted, steam-pressure-controlled pistons in contact with said bearings, a driven shaft, a toothed wheel on said driven shaft, comparatively large friction wheels on said shafts adjacent said adjustable bearings, and reducing pinions at the other ends of said shafts gearing with the toothed wheel on the driven shaft and arranged in axial line with the driving shaft.

In testimony whereof I have hereunto set my hand in presence of two subscribing witnesses.

BENJAMIN BARNES.

Witnesses:
 EDWARD WATERS,
 EDWARD N. WATERS.

---

Copies of this patent may be obtained for five cents each, by addressing the "Commissioner of Patents, Washington, D. C."